Figure 1:
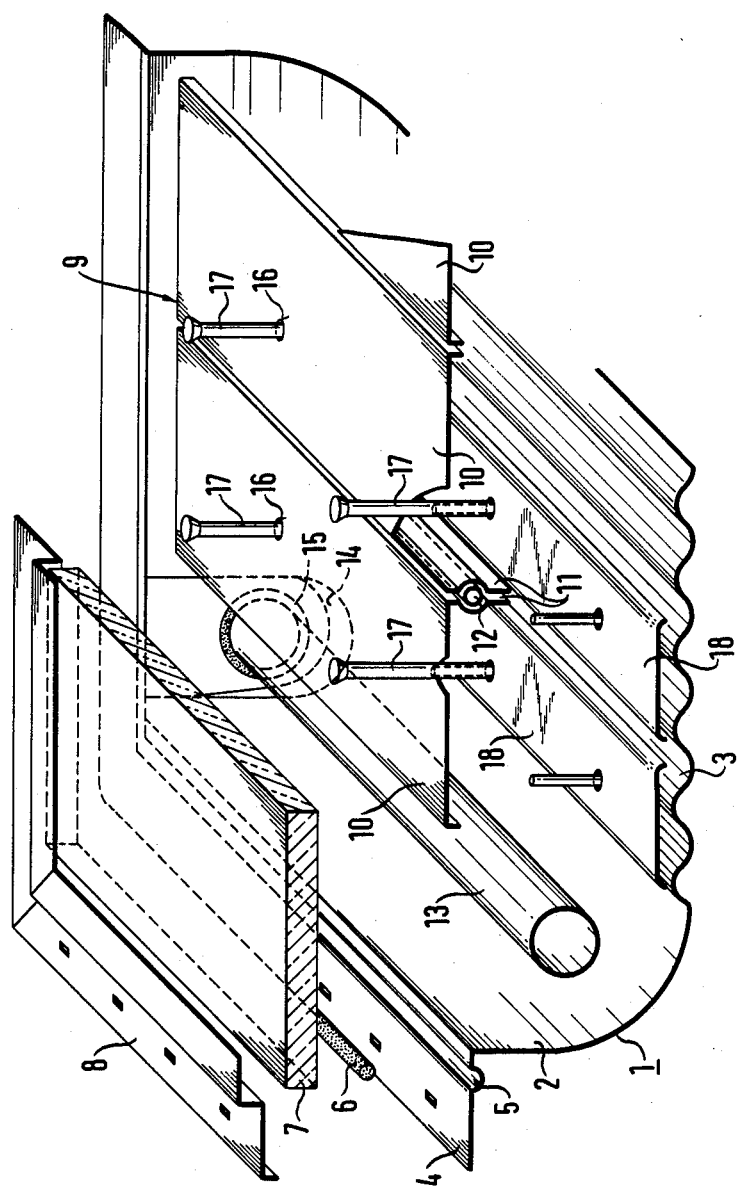

United States Patent [19]
Kellner

[11] Patent Number: 4,881,521
[45] Date of Patent: Nov. 21, 1989

[54] VACUUM SOLAR COLLECTOR

[76] Inventor: Bernd Kellner, Ruckäckerweg 5, D-8400 Regensburg 25, Fed. Rep. of Germany

[21] Appl. No.: 272,742
[22] PCT Filed: Apr. 7, 1987
[86] PCT No.: PCT/EP87/00189
§ 371 Date: Oct. 5, 1988
§ 102(e) Date: Oct. 5, 1988
[87] PCT Pub. No.: WO87/06328
PCT Pub. Date: Oct. 22, 1987

[30] Foreign Application Priority Data
Apr. 8, 1986 [DE] Fed. Rep. of Germany ....... 3611764

[51] Int. Cl.⁴ .............................................. F24V 2/10
[52] U.S. Cl. .................... 126/438; 126/446; 126/447
[58] Field of Search ........................ 126/438, 446, 447

[56] References Cited
U.S. PATENT DOCUMENTS
4,094,301 6/1978 Sorenson et al. .................. 126/447
4,142,510 3/1979 Hare et al. ........................ 126/446
4,186,723 2/1980 Coppola et al. .................... 126/447

Primary Examiner—Carroll B. Dority
Attorney, Agent, or Firm—Sixbey, Friedman, Leedom & Ferguson

[57] ABSTRACT

In a vacuum solar collector comprising a seamless deep-drawn trough (1) which contains an absorber (9) and conduits (12, 13) for a heat transport medium and comprises an edge (4) on which a radiation-permeable pane (7) rests which covers the trough and which is supported over its area by spaced support elements (17) bearing in turn on the trough bottom (3), it is provided that the trough bottom (3) is made corrugated.

20 Claims, 2 Drawing Sheets

VACUUM SOLAR COLLECTOR

The invention relates to a vacuum solar collector.

In a known solar collector of this type (DE-OS 3,101,298) the bottom of the collector trough is planar. As a result, although due to its seamless deep-drawn construction the trough is self-supporting, on evacuation of the solar collector deformations of the trough also occur of such a nature that they subject the cover pane to loads and cause stresses thereof which lead to a danger of breakage of the pane.

From FR-A-2 476 814 there is known a non-evacuated solar collector comprising an absorber which is disposed between a cover and a trough, in which solar collector the trough, which is filled with sand below an insulating layer disposed below the absorber rests through its bottom, which is uneven in a not unambiguously defined manner, on a base supporting this bottom throughout the same.

The problem underlying the invention is to further develop a solar collector of the type mentioned at the beginning in the simplest possible manner so that the form changes of the sheet metal trough occurring on evacuation of the solar collector do not lead to a stressing of the cover pane involving a risk of breakage.

In another connection, that is in a vacuum solar collector in which the absorber plate is included solely between glass covers, it is known from US-A-4,186,723 to provide these covers within a planar flange-like edge with successive intermerging dome-like arches to exclude any change of form of the covers whatever to avoid breakage thereof.

By the formation according to the invention of the bottom of the sheet metal trough, in contrast, a membrane effect is achieved which prevents any bending and twisting of the trough from being transmitted inadmissibly via the walls thereof to the cover pane.

Such an effect is still further improved if the undulations of the trough bottom continue in the side walls of the sheet metal trough parallel to the undulation direction (i.e. the direction in which the wave crests and wave troughs follow each other).

Further advantageous developments of the invention are set forth in dependent claims 3 to 7.

Figure 2:
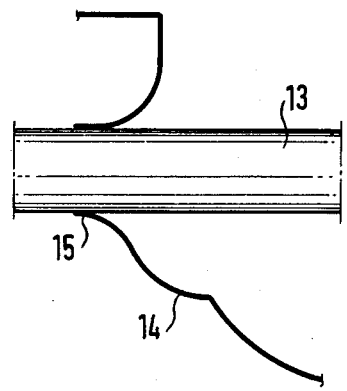
Figure 3:
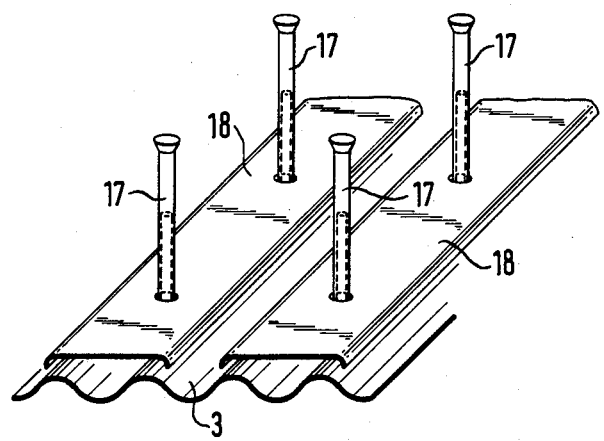

Hereinafter a preferred embodiment of the invention will be described in conjunction with the attached drawings, wherein:

FIG. 1 shows a broken-away perspective exploded view of a vacuum solar collector, FIG. 2 shows schematically a section at the point where a tube passes through the side wall of the collector, and FIG. 3 is a schematic perspective illustration of the arrangement of sheet metal strips provided with support elements on the trough bottom.

FIG. 1 shows in perspective exploded view a corner region of a vacuum solar collector with a rectangular horizontal section. Said collector comprises a box-shaped trough 1 which is deep-drawn starting from a planar sheet metal and is thus integrally seamless and which is formed with side walls 2 convex seen from the outside, a corrugated sheet-like corrugated or undulated trough bottom 3 and a planar flange-like edge 4 which is parallel to the trough bottom and which includes an encircling groove 5 for receiving a seal 6. Corrugated sheet-like undulated here means that in all sections perpendicular to the wave crests or troughs substantially the same roughly sinusoidal form results. On the edge 4 via the seal 6 lies a radiation-permeable cover pane 7 for the trough which is pressed against the trough edge 4 with compression of the seal 6 by a frame 8 which engages over said pane and is connected to the trough edge 4.

In the trough beneath the cover pane 7 there is a radiation absorber 9 which is made up of strip-shaped metal plates 10 which together cover substantially the entire trough cross-section. The absorber plates are connected in pairs via angled sections 11 to the individual passes of a conduit 12 for the heat transport medium laid out in meander form over the cross-section of the trough. The conduit 12 terminates in two collecting tubes 13 (inlet and outlet) which extend parallel to the side walls (preferably the short side walls in a rectangular collector) of the collector trough and one of which is shown in FIG. 1.

The collecting tubes 13 are led out of the trough through bulges 14 which are illustrated schematically in FIG. 2 and which are necked on at 15 and provide passage openings whose plane extends perpendicularly to the collecting tubes 13.

The absorber plates 10 have holes 16 for the passage of supports 17 for supporting the cover pane 7 at regular intervals over the area thereof. The supports 17 are disposed on strip-shaped metal plates 18 which are arranged in the direction of the wave crests of the trough bottom 3 and are slightly bent at their longitudinal edges and engage over two adjacent wave crests. The arrangement of the support 17 on the metal plates is such that the attachment points of the supports lie over wave troughs. In this manner a free space is obtained beneath the support elements which prevents the trough bottom from being marked by the supports 17 which are subjected to load by the cover pane 7 due to the partial vacuum in the absorber.

FIG. 3 shows again separately the arrangement of the sheet metal strips 18 curved at the longitudinal edges with the supports 17 on the trough bottom.

For a solar collector having an area of 1×2 meters the spacing between two successive wave crests in the longitudinal direction of the collector is typically of the order of magnitude of 5 cm. The thickness of the sheet metal of the trough is 1–2 mm.

The convex curvature of the side walls 2 of the trough 1 can be made continuously or alternatively in the form of planar sections following each other in the manner of a polygon.

In a modification of the embodiment illustrated the undulations of the trough bottom can continue in the side walls parallel to the wave direction (i.e. the direction in which the wave crests and troughs follow each other), resulting in increased dimensional stability of the trough after the deep-drawing; said side walls are the longer side walls of the rectangular collector. The corrugations of the long side walls may continue in the short side walls. The side walls are then continuously undulated in the peripheral direction. This further increases the dimensional stability.

What is claimed is:

1. Vacuum solar collector comprising an integrally seamless deep-drawn sheet metal trough (1) which contains an absorber (9) and conduits (12, 13) for a heat transport medium and has an edge (4) on which a radiation-permeable pane (7) rests which covers the sheet metal trough and which is supported over a trough bottom wall by support elements (17) which lie at intervals apart and which in turn bear against metal members disposed on the trough bottom wall (3), characterized in that the trough bottom wall (3) is undulated in the form of a corrugated sheet.

2. Solar collector according to claim 1, characterized in that the corrugations continue in the side walls (2) of the sheet metal trough (1) and extend parallel to the bottom corrugations.

3. Solar collector according to claim 2, characterized in that the corrugations present in the side walls (2) of the sheet metal trough (1) parallel to the bottom corrugations continue into side walls extending perpendicular thereto (2).

4. Solar collector according to claim 3, characterized in that the side walls (2) of the sheet metal trough (1) are convexly curved seen from the outside.

5. Solar collector according to claim 4, wherein said conduits (13) for the heat transport medium emerge through the side walls, characterized in that the side walls (2) at passage points of the tubes (13) for the heat transport medium comprise bulges (14) forming passage openings for the tubes (13).

6. Solar collector according to claim 5, characterized in that the metal members are sheet metal strips and the support elements (17) are disposed on the sheet metal strips (18) which rest on wave crests of the undulations of the trough bottom wall (3) and that the support elements (17) are located over wave troughs of said undulations.

7. Solar collector according to claim 6, characterized in that the support elements (17) are disposed in the centre region of each sheet metal strip (18) which with their slightly bent edge regions engaged over two adjacent wave crests.

8. Solar collector according to claim 1, characterized in that the side walls (2) of the sheet metal trough (1) are convexly curved seen from the outside.

9. Solar collector according to claim 8, wherein said conduits (13) for the heat transport medium emerge through the side walls, and characterized in that the side walls (2) at passage points of the tubes (13) for the heat transport medium comprise bulges (14) forming passage openings for the tubes (13).

10. Solar collector according to claim 9, characterized in that the metal members are sheet metal strips and the support elements (17) are disposed on the sheet metal strips (18) which rest on wave crests of the undulations of the trough bottom wall (3) and that the support elements (17) are located over wave troughs of said undulations.

11. Solar collector according to claim 10, characterized in that the support elements (17) are disposed in the centre region of the sheet metal strips (18) and include slightly bent edge regions engaged over two adjacent wave crests.

12. Solar collector according to claim 2, characterized in that the side walls (2) of the sheet metal trough (1) are convexly curved seen from the outside.

13. Solar collector according to claim 12, wherein said conduits (13) for the heat transport medium emerge through the side walls, and characterized in that the side walls (2) at passage points of the tubes (13) for the heat transport medium comprise bulges (14) forming passage openings for the tubes (13).

14. Solar collector according to claim 13, characterized in that the metal members are sheet metal strips and the support elements (17) are disposed on the sheet metal strips (18) which rest on wave crests of the undulations of the trough bottom wall (3) and that the support elements (17) are located over wave troughs of said undulations.

15. Solar collector according to claim 14, characterized in that the support elements (17) are disposed in the centre region of the sheet metal strips (18) and include slightly bent edge regions engaged over two adjacent wave crests.

16. Solar collector according to claim 1, characterized in that the metal members are sheet metal strips and the support elements (17) are disposed on the sheet metal strips (18) which rest on wave crests of the undulations of the trough bottom wall (3) and that the support elements (17) are located over wave troughs of said undulations.

17. Solar collector according to claim 16, characterized in that the support elements (17) are disposed in the centre region of the sheet metal strips (18) and include slightly bent edge regions engaged over two adjacent wave crests.

18. Solar collector according to claim 3, characterized in that the metal members are sheet metal strips and the support elements (17) are disposed on the sheet metal strips (18) which rest on wave crests of the undulations of the trough bottom wall (3) and that the support elements (17) are located over wave troughs of said undulations.

19. Solar collector according to claim 18, characterized in that the support elements (17) are disposed in the centre region of the sheet metal strips (18) and include slightly bent edge regions engaged over two adjacent wave crests.

20. Solar collector according to claim 4, characterized in that the metal members are sheet metal strips and the support elements (17) are disposed on the sheet metal strips (18) which rest on wave crests of the undulations of the trough bottom wall (3) and that the support elements (17) are located over wave troughs of said undulations.

* * * * *